(12) United States Patent
Wagle et al.

(10) Patent No.: US 7,939,470 B1
(45) Date of Patent: May 10, 2011

(54) INVERT EMULSION DRILLING FLUIDS COMPRISING QUATERNARY AMMONIUM EMULSIFIERS AND ARGILLACEOUS SOLIDS AND METHODS OF DRILLING BOREHOLES

(75) Inventors: Vikrant Bhavanishankar Wagle, Mubai (IN); Shadaab Syed Maghrabi, Thane (IN)

(73) Assignee: Halliburton Energy Services Inc., Duncan, OK (US)

( * ) Notice: Subject to any disclaimer, the term of this patent is extended or adjusted under 35 U.S.C. 154(b) by 0 days.

(21) Appl. No.: 12/661,971

(22) Filed: Mar. 27, 2010

(51) Int. Cl.
C09K 8/36 (2006.01)
E21B 21/00 (2006.01)
B01F 3/08 (2006.01)

(52) U.S. Cl. ....... 507/129; 166/305.1; 175/65; 507/139; 507/140; 516/20; 516/21

(58) Field of Classification Search .................. 507/129, 507/139, 140; 166/305.1; 175/65; 516/20, 516/21
See application file for complete search history.

(56) References Cited

U.S. PATENT DOCUMENTS

| 5,072,794 | A | 12/1991 | Hale et al. |
| 5,076,373 | A | 12/1991 | Hale et al. |
| 5,198,416 | A | 3/1993 | Hale et al. |
| 5,248,665 | A | 9/1993 | Hale et al. |
| 5,472,937 | A | 12/1995 | Fleming et al. |
| 5,494,120 | A | 2/1996 | Hale et al. |
| 5,977,031 | A | 11/1999 | Patel |

FOREIGN PATENT DOCUMENTS

| CA | 2451926 A1 | 6/2005 |
| GB | 2223255 A | 9/1988 |

OTHER PUBLICATIONS

Tony Harlan, et al., Salt-Free Internal Phase Oil Mud Provides Imported Performance, AADE-06-DF-HO-08, presented at AADE 2006 Fluids Conf. in Houston, TX Apr. 11-12, 2006, 9pp.

*Primary Examiner* — Timothy J. Kugel
(74) *Attorney, Agent, or Firm* — Craig W. Roddy; Karen B. Tripp

(57) ABSTRACT

An invert emulsion drilling fluid, and a method for the use thereof in drilling wellbores, with good rheological properties at high temperatures and pressures. One embodiment of the drilling fluids are free of organophilic clays and lignites, free of calcium chloride, and comprise an alcohol in the internal phase, a quaternary ammonium emulsifier, and argillaceous solids. In one embodiment, the alcohol is a glycerol, a polyglycerol, or a mixture thereof. In one embodiment, the base oil for the emulsion is a paraffin and/or mineral oil. The drilling fluids provide good lubricity and high rates of penetration.

20 Claims, 1 Drawing Sheet

INVERT EMULSION DRILLING FLUIDS COMPRISING QUATERNARY AMMONIUM EMULSIFIERS AND ARGILLACEOUS SOLIDS AND METHODS OF DRILLING BOREHOLES

BACKGROUND OF THE INVENTION

1. Field of the Invention

The present invention relates to compositions and methods for drilling, cementing and casing boreholes in subterranean formations, particularly hydrocarbon bearing formations. More particularly, the present invention relates to oil or synthetic fluid based invert emulsion drilling fluids which combine high ecological compatibility with good stability and performance properties. Most particularly, the invention relates to invert emulsion drilling fluids having an internal phase comprising alcohol.

2. Description of Relevant Art

A drilling fluid or mud is a specially designed fluid that is circulated through a wellbore as the wellbore is being drilled to facilitate the drilling operation. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts. Specific drilling fluid systems are selected to optimize a drilling operation in accordance with the characteristics of a particular geological formation.

Oil or synthetic fluid-based muds are normally used to drill swelling or sloughing shales, salt, gypsum, anhydrite or other evaporate formations, hydrogen sulfide-containing formations, and hot (greater than about 300 degrees Fahrenheit ("° F.")) holes, but may be used in other holes penetrating a subterranean formation as well. Unless indicated otherwise, the terms "oil mud" or "oil-based mud or drilling fluid" shall be understood to include synthetic oils or other synthetic fluids as well as natural or traditional oils, and such oils shall be understood to comprise invert emulsions.

Oil-based muds used in drilling typically comprise: a base oil (or synthetic fluid) comprising the external phase of an invert emulsion; a saline, aqueous solution (typically a solution comprising about 30% calcium chloride) comprising the internal phase of the invert emulsion; emulsifiers at the interface of the internal and external phases; and other agents or additives for suspension, weight or density, oil-wetting, fluid loss or filtration control, and rheology control. Such additives commonly include organophilic clays and organophilic lignites. See H. C. H. Darley and George R. Gray, Composition and Properties of Drilling and Completion Fluids 66-67, 561-562 ($5^{th}$ ed. 1988). An oil-based or invert emulsion-based drilling fluid may commonly comprise between about 50:50 to about 95:5 by volume oil or oleaginous phase to water or aqueous phase.

Recent technology as described for example in U.S. Pat. Nos. 7,462,580 and 7,488,704 to Kirsner, et al., introduced "clay-free" invert emulsion-based drilling fluids, which offer significant advantages over drilling fluids containing organophilic clays. As used herein, the term "clay-free" (or "clayless") means a drilling fluid made without addition of any organophilic clays or lignites to the drilling fluid composition.

In conventional invert emulsion drilling fluids, and in the new "clay-free" invert-emulsion drilling fluids first described by Kirsner, et al., brine rather than pure water is used for the internal phase because the salts such as calcium chloride in the brine enable balancing of osmotic pressures during drilling through shales. That is, the salt helps keep the water activity of the drilling fluid the same as the water activity of the shale, thereby preventing the flow of water from the drilling fluid into the shales and thus avoiding swelling of the shales. The concentration of salt used in the internal phase depends on the activity of water present in the shales.

Use of high concentrations of chloride salts can give rise to disposal issues and environmental concerns and can also result in high conductivity which interferes with the sensitivity of induction logs during exploratory drilling. Alternative electrolytes, such as potassium acetate or formate, have been used, but these salts are often cost prohibitive and still limit induction log sensitivity. Other substitutes such as potassium chloride, sodium chloride and magnesium sulfate result in similar disposal issues.

Alcohols, particularly glycerols, polyglycerols, and cyclicetherpolyols have also been tried as an alternative to calcium chloride brines for the internal phase of conventional invert emulsion drilling fluids. An advantage of using alcohols in the internal phase is that much of the concern for the ionic character of the internal phase is no longer required. When water is not present in the system, hydration of the shales is greatly reduced. Alcohols can still interact with the clays of the shales but swelling is considered still significantly less than with water. Conventionally, the problem with using alcohols as an internal phase of an invert emulsion is that the invert emulsions tend to be less stable at the high temperatures commonly encountered in subterranean formations during drilling for hydrocarbons. This instability is believed to be due to the alcohols tending to separate or become insoluble at elevated temperatures. Even when more heat tolerant alcohols are employed, barite settling and an undesirably high filtrate rate indicating invert emulsion instability at high temperatures and high pressures have been observed.

Invert emulsion-based muds or drilling fluids (also called invert drilling muds or invert muds or fluids) comprise a key segment of the drilling fluids industry, but they are increasingly being subjected to greater environmental restrictions and performance and cost demands. The complexities and unpredictability of the interaction and behavior of the fluid components with each other and with the conditions encountered during drilling makes meeting these demands challenging. There is a continuing need and thus ongoing industry-wide interest in new drilling fluids that provide improved performance while still affording environmental and economical acceptance.

SUMMARY OF THE INVENTION

The present invention provides an invert emulsion drilling fluid, and a method for the use thereof in drilling wellbores. That is, the drilling fluid of the invention comprises an alcohol in the internal phase, a quaternary ammonium emulsifier, and finely divided argillaceous solids. The alcohol is or comprises a glycerol, a polyglycerol or a mixture thereof. The base oil for the emulsion in one embodiment is a paraffin and/or mineral oil. In one embodiment, the drilling fluid is also free of organophilic clay and/or calcium chloride and similar salts.

As used herein, the term "drilling" or "drilling wellbores" shall be understood in the broader sense of drilling operations, which includes running casing and cementing as well as drilling, unless specifically indicated otherwise. The method of the invention comprises using the drilling fluid of the invention in drilling wellbores. During drilling, the drilling fluid is not dependent on organophilic clays (also called "organo-clays") to obtain suspension of drill cuttings or other solids at rest, and lacks a significant (if any) pressure spike upon resumption of drilling.

In embodiments where the drilling fluid is free of organophilic clay, the drilling fluid of the invention provides the advantages of an organophilic clay-free system as well as high pressure, high temperature (HTHP) stability. While some organophilic clay may enter the fluid in the field, for example due to mixing of recycled fluids with the fluid of the invention, the fluid of the invention is tolerant of such clay in insubstantial quantities, that is in quantities less than about 3 pounds per barrel. The fluid of the invention, however, behaves more like a traditional drilling fluid when more than about 3 pounds per barrel of organo-clays are present. Similarly, in embodiments where the drilling fluid is free of calcium chloride and similar (or substitutable) salts, the fluid of the invention is tolerant of such salts that may enter the fluids in insubstantial quantities. The addition of a quaternary ammonium emulsifier along with sized argillaceous solids to the drilling fluid according to the invention results in a stable emulsion and low HTHP fluid loss.

In one embodiment, the quaternary ammonium emulsifier used in an invert emulsion drilling fluid of the present invention is selected from the group consisting of quaternary ammonium compounds having either the general formula:

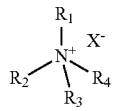

where $R_1$, $R_2$, $R_3$ is selected from: H; saturated or unsaturated alkyl groups containing $C_1$ to $C_{22}$ carbon atoms; aromatic groups; alkyl-aryl, heterocyclic groups; sugar groups; and mixtures or combinations thereof; $R_4$ is an alkyl group containing $C_8$ to $C_{22}$ carbon atoms; and X is selected from: an anion; a chloride anion or other halogen; sulfate ion; nitrate ion; citrate ion; formate ion; phosphate ion; acetate ion; methylsulfonate ion; para-toluene sulfonate ion; or having the general formula:

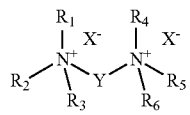

where $R_1$, $R_2$, $R_4$, $R_5$ is selected from: H, saturated or unsaturated alkyl groups containing $C_1$ to $C_{22}$ carbon atoms, aromatic groups, alkyl-aryl groups, heterocyclic groups, sugar groups; and $R_3$, $R_6$ is an alkyl group containing $C_8$ to $C_{22}$ carbon atoms. Y can be hydrophobic or partially hydrophobic, aromatic, cyclic or acyclic group and where Y is selected from: O; $O(CH_2)_n$; $(CH_2)_n$ where n=1 to 18; a ketonic group; an ester group; or an amide group. X is an anion, a chloride anion or other halogen, sulfate ion, nitrate ion, citrate ion, formate ion, phosphate ion, acetate ion, methylsulfonate ion, or paratoluene sulfonate.

In one embodiment, the sized argillaceous solids used in the invention have particle sizes less than about US#200 mesh. Such finely divided argillaceous materials include for example without limitation shale, siltstones, argillite and mudstone. The composition of argillaceous solids may comprise clay or a clay type material as a minor (less than 50%) or major (50% or more) component. The combination of emulsifiers with sized argillaceous solids is believed to help stabilize the invert emulsion fluids and impart to the fluids acceptable drilling fluid rheology and fluid loss.

DETAILED DESCRIPTION OF PREFERRED EMBODIMENTS

Figure 1:
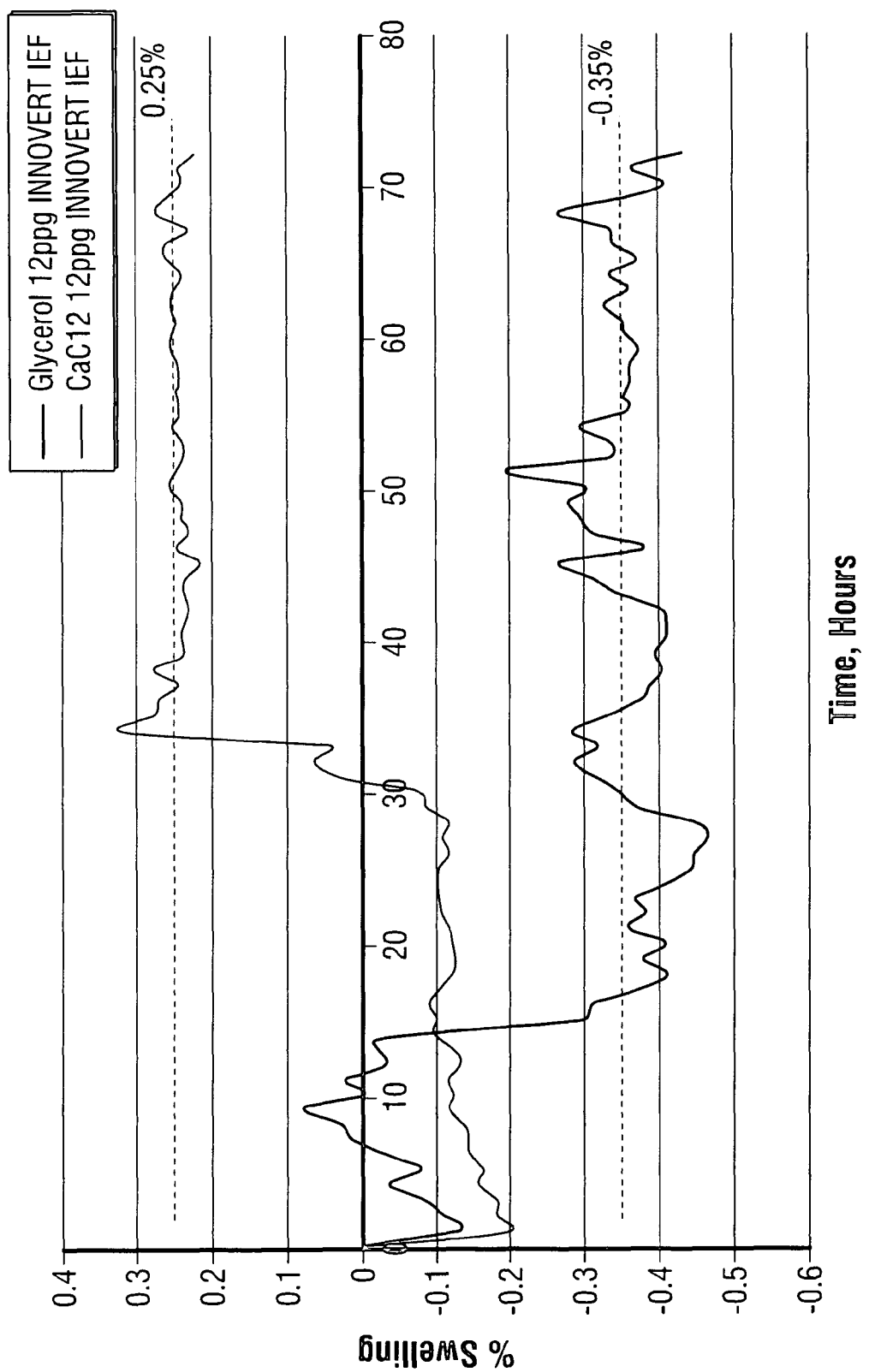
FIG. 1 is a graph comparing results of linear swell meter studies on 12 ppg clay-free invert emulsion drilling fluids comprising a 25% calcium chloride brine as the internal phase with 12 ppg clay-free invert emulsion drilling fluids comprising 60% aqueous glycerol as the internal phase.

In one embodiment, the present invention provides an invert emulsion drilling fluid that meets environmental constraints against calcium chloride salts and provides improved performance in the field, even at high temperatures and pressures. In this or another embodiment, the fluids of the present invention are "clayless" or "clay-free," meaning that they are made without the addition of organophilic clays or lignites.

The invert emulsion drilling fluids for use in one embodiment of the present invention are mineral oil based systems or mineral oil/paraffin based systems, such as, for example, the INNOVERT® invert emulsion fluid available from Baroid Fluid Services, a Halliburton Company, in Houston, Tex. and Duncan, Okla. which has a paraffin and/or mineral oil base. An example of a commercially available base oil for use in the invention is ESCAID® 110 desulfurized hydrogenated kerosene oil base from ExxonMobil, USA in Houston, Tex. and ExxonMobil Chemical Company in Houston, Tex.

In one embodiment, the internal phase of the invert emulsion drilling fluids of the present invention may contain some water but is comprised of at least about 60% alcohol, and can contain as much as about 90% alcohol. In this embodiment, such alcohol is selected from the group of alcohols consisting of glycerols, polyglycerols and mixtures thereof. Having as little as about 40% alcohol in the internal phase or as much as 100% alcohol in the internal phase may also provide the benefits of the present invention.

The internal phase in one embodiment of the invention is "salt-free." As used herein, "salt-free" means without the addition of calcium chloride salts, or known substitutes such as potassium chloride, sodium chloride, magnesium sulfate, potassium acetate or formate. Nevertheless, such a "salt-free" fluid of the invention is tolerant of such salts that may enter the fluids in insubstantial quantities, that is, in quantities less than about 3 pounds per barrel, as may occur, for example, in use in the field as when the fluid of the invention is mixed with recycled drilling fluids. The fluids of the invention, however, behave more like traditional drilling fluids when quantities greater than about 3 pounds per barrel of salts are present.

The invert emulsion drilling fluids of the present invention contain a quaternary ammonium emulsifier. In one embodiment, the quaternary ammonium emulsifier is selected from the group consisting of quaternary ammonium compounds or compositions. Example quaternary ammonium compounds for use as emulsifiers in the fluids of the present invention are bis(hydrogenated tallow alkyl) dimethyl chloride, hereinafter referred to as "QUAT 1," and methyl dehydrogenated tallow benzyl ammonium chloride, hereinafter referred to as "QUAT 2," discussed in more detail in the experimental section below.

An example commercially available QUAT 1 is ADOGEN® 442 H quaternary ammonium compound or compositions, available from Sherex Chemical Company, Inc in Dublin, Ohio, and an example commercially available QUAT 2 is VARIQUAT® B 343 A quaternary ammonium compound or composition available from Evonik Goldschmidt Chemical Corporation in Hopewell, Va.

In an embodiment more generally, the quaternary ammonium emulsifier used in an invert emulsion drilling fluid of the present invention is selected from the group consisting of quaternary ammonium compounds having either the general formula:

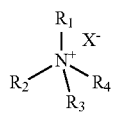

where $R_1$, $R_2$, $R_3$ is selected from: H; saturated or unsaturated alkyl groups containing $C_1$ to $C_{22}$ carbon atoms; aromatic groups; alkyl-aryl, heterocyclic groups; sugar groups; and mixtures or combinations thereof; $R_4$ is an alkyl group containing $C_8$ to $C_{22}$ carbon atoms; and X is selected from: an anion; a chloride ion or other halogen; sulfate ion; nitrate ion; citrate ion; formate ion; phosphate ion; acetate ion; methylsulfonate ion; para-toluene sulfonate ion; or having the general formula:

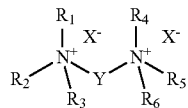

where $R_1$, $R_2$, $R_4$, $R_5$ is selected from: H, saturated or unsaturated alkyl groups containing $C_1$ to $C_{22}$ carbon atoms, aromatic groups, alkyl-aryl groups, heterocyclic groups, sugar groups and $R_3$, $R_6$ is an alkyl group containing $C_8$ to $C_{22}$ carbon atoms. Y can be a hydrophobic or partially hydrophobic, aromatic, cyclic or acyclic group, and Y is selected from: O; $O(CH_2)_n$; $(CH_2)_n$ where n=1 to 18; a ketonic group, an ester group, an amide group. X is an anion, a chloride anion or other halogen, sulfate ion, nitrate ion, citrate ion, formate ion, phosphate ion, acetate ion, methylsulfonate ion, para-toluene sulfonate.

Typical useful quaternary ammonium compounds or compositions for use in the invention include without limitation Dodecyl Trimethyl Ammonium Chloride, Coconut Trimethyl Ammonium Chloride, Hexadecyl Trimethyl Ammonium Chloride, Octadecyl Trimethyl Ammonium Chloride, Octadecyl/Behenyl Trimethyl Ammonium Chloride, Behenyl Trimethyl Ammonium Chloride, Cocoamidopropyl Trimethyl Ammonium Chloride, Coconut Bis(2-Hydroxyethy)Methyl Ammonium Chloride, Stearyl bis(2-hydroxyethyl)Methyl Ammonium Chloride, Alkyl Dimethyl Benzyl Ammonium Chloride, Benzalkonium Chloride, Benzalkonium Chloride, Benzalkonium Chloride, Tetradecyl Dimethyl Benzyl Ammonium Chloride, Octadecyl Dimethyl Benzyl Ammonium Chloride, Dioctyl Dimethyl Ammonium Chloride, Di(Octyl-Decyl) Dimethyl Ammonium Chloride, Didecyl Dimethyl Ammonium Chloride, Didodecyl Dimethyl Ammonium Chloride, Dihexadecyl Dimethyl Ammonium Chloride, Distearyl Dimethyl Ammonium Chloride, Di(hydrogenated Tallow)Dimethyl Ammonium Chloride, Di(hydrogenated Tallow)Benzyl Methyl Ammonium Chloride, Trioctyl Methyl Ammonium Chloride, Tri (Octyl-Decyl) Methyl Ammonium Chloride, Tridodecyl Methyl Ammonium Chloride, Trihexadecyl Methyl Ammonium Chloride, Dodecyl Trimethyl Ammonium Bromide, Dodecyl Dimethyl Benzyl Ammonium Bromide, Di-(Octyl-Decyl)Dimethyl Ammonium Bromide, Didecyl Dimethyl Ammonium Bromide, Dilinoleyl Amidopropyl Trimonium Chloride, Bishydroxyethyl Dihydroxypropyl Stearammonium Chloride, Hydroxypropyl Bisstearyldimmonium Chloride, Isostearyl Ethylimidazolinium Ethosulfate, Linoleamidopropyl PG-Dimonium Chloride Phosphate, Propylene Glycol, Dihydroxypropyl PEG-5 Linoleammonium Chloride, and Dihydroxypropyl PEG-5 Linoleammonium Chloride.

One or more other emulsifiers may be used in the invert emulsion drilling fluids of the present invention in addition to the quaternary ammonium emulsifier. Other additives to comprise a complete drilling fluid may also be used so long as the additives do not include organophilic clays or lignites, and do not include sodium chloride or known sodium chloride salt substitutes such as potassium chloride, calcium chloride, magnesium sulfate, potassium acetate, or formate. Typical additives suitable for use in drilling fluids of the present invention include, for example: additives to reduce or control temperature rheology or to provide thinning, for example, additives having the tradenames COLDTROL®, ATC®, and OMC2™; additives for enhancing viscosity, for example, an additive having the tradename RHEMOD L™; additives for providing temporary increased viscosity for shipping (transport to the well site) and for use in sweeps, for example, an additive having the tradename TEMPERUS™ (modified fatty acid); additives for filtration control, for example, additives having the tradename ADAPTA®; emulsifier activator like lime, additives for high temperature high pressure control (HTHP) and emulsion stability, for example, additives having the tradename FACTANT™ (highly concentrated tall oil derivative); and additives for emulsification, for example, additives having the tradename LE SUPERMUL™ (polyaminated fatty acid). All of the aforementioned trademarked products are available from Halliburton Energy Services, Inc. in Houston, Tex., U.S.A.

Sized argillaceous solids are also used in the invention. In one embodiment, the argillaceous solids have particle sizes less than about US#200 mesh. Such argillaceous materials include for example without limitation shale, siltstones, argillite and mudstone. The argillaceous solids may comprise clay or a clay type material (but not an organophilic clay) as a minor (less than 50%) or major (50% or more) component of the argillaceous solids. The combination of emulsifier(s) with the sized argillaceous solids is believed to help stabilize the invert emulsion fluids and impart to the fluids acceptable drilling fluid rheology and fluid loss.

The water or aqueous phase of the invert emulsion based fluids of the invention can take a limited number of forms. It can be in the form of discrete isolated spherical droplets dispersed in oil. It can be absorbed on the solid surfaces in droplet (partial wetting) form. The solid surfaces needed for the stabilization are believed to be provided by the presence of argillaceous solids which adsorb at the oil-water interface. The quaternary ammonium compounds are believed to help in the wetting of the solid surfaces, and particularly the clay in the argillaceous solids, thereby aiding the absorption of water on the clay surface in the argillaceous solids and hence stabilizing the water-in-oil emulsion.

Experiments

The formulations of the invert emulsion drilling fluids of the invention vary with the particular requirements of the subterranean formation. Example formulations of invert emulsion drilling fluids of the present invention were prepared and laboratory tested to demonstrate the effectiveness of the invention.

Except where noted otherwise, all products in Tables 1, 2 and/or 3, are available from Halliburton Energy Services, Inc. in Houston, Tex. and Duncan Okla., including:

ADAPTA® crosslinked copolymer for HTHP filtration control;

BARACARB® bridging agent, which is a sized calcium carbonate (ground marble);

BAROID® weighting agent, which is grown barium sulfate;

BDF-508 dimer diamine rheology modifier.

DURATONE® HT filtration control agent, which is an organophilic lignite, more particularly organophilic leonardite;

EZ MUL® NT emulsifier, which is a polyaminated fatty acid;

FACTANT® emulsifier, which is a highly concentrated tall oil derivative that provides both GELTONE® II organophilic clay;

HTHP filtration control and stable emulsification;

QUAT 2, which is a quaternary alkyl-aryl ammonium composition (methyl, benzyl dihydrogenated tallow quat amine chloride salt), having the following specific formula and composition:

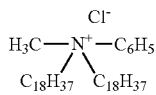

| Compound | Cas No. | Concentration (%) |
| --- | --- | --- |
| 2-Propanol (isopropanol) | 67-63-0 | >=10-<=15 |
| Methyl chloride | 74-87-3 | >=0-<0.03 |
| Benzene, (chloromethyl)- | 100-44-7 | >=0-<0.08 |

QUAT 1, which is a quaternary ammonium composition (dimethyl dihydrogenated tallow quat amine chloride salt), having the following specific formula and composition:

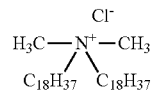

| Compound | Cas No. | Concentration (%) |
| --- | --- | --- |
| Quaternary ammonium compounds, di-C14-18- alkyldimethyl, chlorides | 68002-59-5 | 80-95 |
| 2-Propanol (isopropanol) | 67-63-0 | 5-20 |
| Water | 7732-18-5 | 1-10 |
| Methyl chloride | 74-87-3 | <0.03 |

RHEMOD™ viscosifier, which is a modified fatty acid that is used to provide suspension and viscosity in non-aqueous drilling fluids;

TAU-MOD™ viscosifying/suspension agent, which is an amorphous/fibrous material; and ESCAID® 110 oil, which is a desulfurized hydrogenated kerosene low toxicity oil containing less than 0.1% sulfur and less than 1% aromatics, and which is available from Exxon-Mobil Company, U.S.A., Houston, Tex., and ExxonMobil Chemical Company, Houston, Tex.

Table 1 provides various formulations of invert emulsion drilling fluids prepared with ESCAID® 110 oil base (comprising desulfurized hydrogenated kerosene—$C_{11}$-$C_{14}$ hydrocarbons: n-alkanes, isoalkanes, cyclics, <2% aromatics), and an internal phase having 60% (Runs 1-4), 80% (Run 5) or 90% (Run 6) glycerol with the remainder water, and a quaternary ammonium emulsifier; QUAT 1—Runs 2-6—or QUAT 2—Run 1. Run 7 in Table 1 is a "control" prepared according to prior art drilling fluids, that is, an invert emulsion drilling fluid prepared with ESCAID® base oil and an aqueous internal phase comprising calcium chloride salts.

Thus, Table 1 below provides example formulations and properties for the clay-free, salt-free, invert emulsion drilling fluids of the invention and compares then to the "control," a clay-free invert emulsion drilling fluid without alcohol in the internal phase and without a quaternary amine emulsifier. In determining the properties set forth in Table 1, samples of the fluids were sheared in a commercial blender at 7,000 rpm for the time indicated in the Table and then rolled at 250° F. for 16 hours, and then stirred for 10 minutes. Measurements were taken with the fluids at 120° F., except where indicated otherwise. The measurements indicate the fluids of the invention provide stable invert emulsions and have good rheological properties for drilling.

Table 1 also shows results of erosion studies done using dried London clay in the test fluid. The method used for shale erosion tests is adopted from the API 13I procedure described in American Petroleum Institute Recommended Practice for Laboratory Testing of Drilling Fluids, Eighth Edition (March 2009), with a few modifications described herein. The dried shale cuttings used in this test are sieved between US sieve No. 5 and No. 10. Thirty grams of the sieved shale are then added to 350 ml of the test fluid kept in a pint jar. The jar and its contents are then rolled for 16 hours at 150° F. in a roller oven after which the bottle is emptied over a US sieve No. 10. The recovered shale is briefly rinsed with the base oil to remove any adherent test fluid and then allowed to dry at 221° F. for 20 hours after which it is immediately weighed to determine the percentage of recovered shale cuttings after the erosion test.

The invert emulsion fluids of the invention having an internal phase containing about 60% glycerol gave a shale retention value of 75% (Run 3) whereas the invert emulsion fluids of the invention having an internal phase containing about 80% and 90% glycerol gave shale retention values of 86% and 89% respectively (Runs 5 and 6). These shale retention values compared favorably with the value of 86.6% obtained when the London clay was subjected to shale erosion using 12 ppg $CaCl_2$ (25% concentration) (Run 7).

TABLE 1

Formulation of 12 ppg Invert Emulsion Drilling Fluids
With Aqueous Glycerol Internal Phase
(OWR: 70:30)

| Formulation Components | Mix Time, Min. | Test Run 1 | Test Run 2 | Test Run 3 | Test Run 4 | Test Run 5 | Test Run 6 | Test Run 7 |
|---|---|---|---|---|---|---|---|---|
| Aqueous Glycerol Conc (w/w) | | 60% | 60% | 60% | 60% | 80% | 90% | — |
| ESCAID ® oil, bbl | | 0.54 | 0.54 | 0.54 | 0.54 | 0.51 | 0.51 | 0.49 |
| EZ MUL ® NT emulsifier, ppb | 2 | 12.00 | 12.00 | 12.00 | 12.00 | 12.00 | 12.00 | 12.00 |
| FACTANT ® emulsifier, ppb | | — | — | — | — | 1 | 1 | — |
| Lime, ppb | 2 | 1.30 | 1.30 | 1.30 | 1.30 | 1.30 | 1.30 | 1.30 |
| RHEMOD ™ L, viscosifier, ppb | 5 | 3.0 | 3.0 | 3.0 | 3.0 | 3.0 | 3.0 | 3.0 |
| ADAPTA ® copolymer, ppb | 5 | 2.0 | 2.0 | 2.0 | 2.0 | 2.0 | 2.0 | 2.0 |
| QUAT 2, emulsifier, ppb | 5 | 5.0 | — | — | — | — | — | — |
| QUAT 1, emulsifier, ppb | 5 | — | 2.5 | 3.5 | 5.0 | 5.0 | 5.0 | — |
| Glycerol soln, ppb | 5 | 88.01 | 88.83 | 88.47 | 87.92 | 92.77 | 93.45 | — |
| $CaCl_2$ (WPS 250K ppm), ppb | 5 | — | — | — | — | — | — | 117 |
| Revdust, ppb | 5 | 20.0 | 20.0 | 20.0 | 20.0 | 30.0 | 30.0 | 20.0 |
| BARACARB ® 5 bridging agent, ppb | | — | — | — | — | 50 | 50 | 25 |
| BARACARB ® 25 bridging agent, ppb | | — | — | — | — | — | — | 25 |
| BAROID ® weighting agent, ppb | 10 | 224.30 | 224.40 | 224.40 | 224.40 | 30.00 | 162.96 | 158.57 |
| BDF-508 rheology modifier, ppb | 5 | — | — | — | — | 2 | 2 | — |
| Hot rolled at 250° F., 16 hrs | | | | | | | | |
| 600 rpm | | 80 | 64 | 80 | 104 | 118 | 105 | 106 |
| 300 rpm | | 53 | 40 | 53 | 72 | 75 | 65 | 66 |
| 200 rpm | | 42 | 31 | 41 | 59 | 58 | 49 | 54 |
| 100 rpm | | 31 | 21 | 30 | 43 | 40 | 32 | 37 |
| 6 rpm | | 12 | 8 | 11 | 19 | 15 | 10 | 13 |
| 3 rpm | | 11 | 7 | 10 | 17 | 14 | 9 | 12 |
| PV | | 27 | 24 | 27 | 33 | 43 | 40 | 38 |
| YP | | 26 | 16 | 26 | 38 | 32 | 25 | 30 |
| TAU 0 | | 10 | 6 | 9 | 15 | 13 | 8 | 11 |
| GELS 10 sec | | 14 | 8 | 13 | 23 | 20 | 13 | 16 |
| GELS 10 min | | 19 | 12 | 20 | 31 | 25 | 19 | 32 |
| HTHP, ml/30 min (250° F.) | | 1.6 | 0.2 | 0.4 | 0.2 | 0.8 | 1.0 | 1.2 |
| Shale retention | | — | — | 75 % | — | 86 % | 89 % | 86.8 % |

Table 2 provides example formulations of 16 ppg invert emulsion drilling fluids of the invention containing ESCAID® 110 oil base and an aqueous internal phase having 60% polyglycerol, with either QUAT 1 or QUAT 2 emulsifier. These formulations were tested at even higher temperatures—300° F. than the formulations whose tests results were reported in Table 1 (tested at 250° F.). Polyglycerol is believed to be more heat tolerant than glycerol and the tests results in Table 2 were satisfactory, especially when the quaternary ammonium composition used was QUAT 1 (which is dimethyl dehydrogenated tallow quaternary amine chloride salt). That is, for the HTHP test, only 2 ml of filtrate resulted over a 30 minute period at 300° F.

TABLE 2

Formulation of 16 ppg Invert Emulsion Drilling Fluids
Containing 60% Polyglycerol as the Aqueous Phase

| Formulation Components | Mixing Time, min | Run 1 | Run 2 |
|---|---|---|---|
| OWR | | 80/20 | 80/20 |
| ESCAID ® 110 oil, bbl | | 0.48 | 0.48 |
| EZ MUL ® NT emulsifier, ppb | 2 | 15.00 | 15.00 |
| Lime, ppb | 2 | 2.50 | 2.50 |

TABLE 2-continued

Formulation of 16 ppg Invert Emulsion Drilling Fluids
Containing 60% Polyglycerol as the Aqueous Phase

| Formulation Components | Mixing Time, min | Run 1 | Run 2 |
|---|---|---|---|
| RHEMOD ® L viscosifier, ppb | 5 | 3.00 | 3.00 |
| ADAPTA ® copolymer, ppb | 5 | 2.00 | 2.00 |
| QUAT 2 emulsifier, ppb | 5 | 5.00 | — |
| QUAT 1 emulsifier, ppb | 5 | — | 3.50 |
| 60% Polyglycerol soln, ppg | 5 | 47.23 | 47.54 |
| Revdust, ppb | 5 | 20.00 | 20.00 |
| BAROID ® weighting agent, ppb | 10 | 444.40 | 444.58 |
| Hot rolled at 300° F., 16 hrs. | | | |
| 600 rpm | | 85 | 88 |
| 300 rpm | | 49 | 50 |
| 200 rpm | | 36 | 37 |
| 100 rpm | | 23 | 24 |
| 6 rpm | | 7 | 7 |
| 3 rpm | | 6 | 6 |
| PV | | 36 | 38 |
| YP | | 13 | 12 |
| TAU 0 | | 5 | 5 |
| GELS 10 sec | | 8 | 8 |
| GELS 10 min | | 13 | 13 |
| HTHP ml/30 min (300° F.) | | 5/2 | 2 |

Table 3 provides rheological test results comparing a salt-free invert emulsion drilling fluid prepared with ESCAID® 110 oil base and an aqueous internal phase comprising 60% glycerol but without a quaternary ammonium emulsifier, and with organophilic clay (Runs 4 and 5) and without organophilic clay (Runs 1-3). None of these fluids are fluids of the invention but by contrast, when the results are considered with and compared to the test results set forth in Tables 1 and 2, the results in the tables demonstrate the synergy that exists with the combination of components of the present invention in Tables 1 and 2. Runs 1-3 in Table 3 were conducted with a clay-free, salt-free fluid having the same base oil and the same alcohol, in the same amount or percentage, as the runs 1-4 in Table 1. However, runs 1-3 in Table 3 did not have the quaternary ammonium emulsifier and the results indicated that an invert emulsion could not hold together. The fluids in runs 1-3 in Table 3 were failures with respect to being used as drilling fluids. When organophilic clay was used with the fluids—runs 4 and 5 in Table 3, the emulsion did hold and the fluids could be used, however those fluids sacrificed the known advantages of a clay-free system to hold the emulsion together.

TABLE 3

Formulation of 12 ppg Salt Free Invert Emulsion Fluids in the presence and absence of organophilic clay and organophilic lignite

| MUD WEIGHT | 12 ppg | 1 | 2 | 3 | 4 | 5 |
|---|---|---|---|---|---|---|
| ESCAID 110 ® oil, bbl | | 0.52 | 0.51 | 0.51 | 0.54 | 0.54 |
| EZ MUL NT ® emulsifier, ppb | | 12 | 12 | 7 | 12 | 4.5 |
| INVERMUL NT ®, ppb | | — | — | 5 | — | 6.5 |
| Lime, ppb | | 1.30 | 1.30 | 1.30 | 2.5 | 2.5 |
| RHEMOD L ® viscosifier, ppb | | 3.00 | 3.00 | 3.00 | — | — |
| ADAPTA ® copolymer, ppb | | 2.00 | 2.00 | 2.00 | — | — |
| GELTONE II organophilic clay, ® ppb | | — | — | — | 7 | 7 |
| DURATONE HT ®, ppb | | — | — | — | 12 | 12 |
| Glycerol soln (60% w/w), ppb | | 93.04 | 93.29 | 93.29 | 89.26 | 89.21 |
| TAUMOD ®, ppb | | — | 5.00 | 5.00 | — | — |
| Revdust, ppb | | 20.00 | 20.00 | 20.00 | 20 | 20 |
| BAROID ®, ppb | | 179.53 | 175.87 | 175.87 | 211.57 | 211.12 |
| BARACARB 5 ®, ppb | | 25.00 | 25.00 | 25.00 | — | — |
| BARACARB 25 ®, ppb | | 25.00 | 25.00 | 25.00 | — | — |
| Hot rolled at 250 F., 16 hrs | | | | | | |
| 600 rpm | @120° F. | Barite | Barite | Barite | 66 | 60 |
| 300 rpm | @120° F. | settling | settling | settling | 40 | 36 |
| 200 rpm | @120° F. | and oil | and oil | and oil | 30 | 27 |
| 100 rpm | @120° F. | separation | separation | separation | 20 | 17 |
| 6 rpm | @120° F. | | | | 6 | 6 |
| 3 rpm | @120° F. | | | | 5 | 5 |

TABLE 3-continued

Formulation of 12 ppg Salt Free Invert Emulsion Fluids in the presence and absence of organophilic clay and organophilic lignite

| MUD WEIGHT | 12 ppg | 1 | 2 | 3 | 4 | 5 |
|---|---|---|---|---|---|---|
| PV |  |  |  |  | 26 | 24 |
| YP |  |  |  |  | 14 | 12 |
| TAU 0 |  |  |  |  | 4 | 4 |
| GELS 10 sec |  |  |  |  | 6 | 6 |
| GELS 10 min |  |  |  |  | 10 | 9 |
| HTHP, ml/30 min (250 F.) |  | — | — | — | 2 | 1.6 |

Further demonstrating the advantages of the present invention, FIG. 1 graphs the results of a Linear Swell Meter study (LSM), conducted in accordance with testing instructions provided in the Model 2000 Linear Swell Meter Instruction Manual 209792 Revision F, available from Fann Instrument Company and Halliburton Energy Services, Inc. in Houston, Tex. For the LSM test, the dried and pulverized shale sample (London clay) is screened through a US sieve no 200. One gm of water is then uniformly mixed with 19 gm of the sieved shale sample and the resultant 20 gm sample is pressed into a pellet-sized core under a pressure of 10,000 psi. The pellet-sized core then is mounted on an acrylic screen and a teflon-plunger cap is placed on top of the core. The whole stack comprising the acrylic screen, core and teflon plunger is encased using a core holder and then placed in a thermocup adjusted to a temperature of 150° F. The plunger of the Fann® LSM unit (Model 2000) is then brought into contact with the core through the teflon-plunger cap and the test fluid is then poured into the thermocup such that it completely covers the sample core. The test is then run for 72 hours until the swelling curve reaches a plateau indicating very little or no additional swelling of the shale sample.

Graph 1 compares a prior art clay-free, invert emulsion 12 ppg INNOVERT® drilling fluid having a 25% $CaCl_2$ brine internal phase with a clay-free, salt free, invert emulsion fluid of the invention, a 12 ppg INNOVERT® drilling fluid having a 60% aqueous glycerol internal phase (and a quaternary ammonium emulsifier). The prior art fluid showed a maximum swelling of 0.25% of the London clay shale and the fluid of the invention showed a maximum swelling of minus (−)0.35% of the London clay shale.

As indicated above, the advantages of the methods of the invention may be obtained by employing a drilling fluid of the invention in drilling operations. The drilling operations—whether drilling a vertical or directional or horizontal borehole, conducting a sweep, or running casing and cementing—may be conducted as known to those skilled in the art with other drilling fluids. That is, a drilling fluid of the invention is prepared or obtained and circulated through a wellbore as the wellbore is being drilled (or swept or cemented and cased) to facilitate the drilling operation. The drilling fluid removes drill cuttings from the wellbore, cools and lubricates the drill bit, aids in support of the drill pipe and drill bit, and provides a hydrostatic head to maintain the integrity of the wellbore walls and prevent well blowouts. The specific formulation of the drilling fluid in accordance with the present invention is optimized for the particular drilling operation and for the particular subterranean formation characteristics and conditions (such as temperatures). For example, the fluid is weighted as appropriate for the formation pressures and thinned as appropriate for the formation temperatures. As noted previously, the fluids of the invention afford real-time monitoring and rapid adjustment of the fluid to accommodate changes in such subterranean formation conditions. Further, the fluids of the invention may be recycled during a drilling operation such that fluids circulated in a wellbore may be recirculated in the wellbore after returning to the surface for removal of drill cuttings for example. The drilling fluid of the invention may even be selected for use in a drilling operation to reduce loss of drilling mud during the drilling operation and/or to comply with environmental regulations governing drilling operations in a particular subterranean formation.

The foregoing description of the invention is intended to be a description of preferred embodiments. Various changes in the details of the described fluids and methods of use can be made without departing from the intended scope of this invention as defined by the appended claims.

What is claimed is:

1. An invert emulsion drilling fluid for drilling in a subterranean formation comprising:
   an oleaginous continuous phase;
   an internal phase comprising an alcohol;
   a quaternary ammonium emulsifier, selected from the group consisting of quaternary ammonium compounds having a general formula:

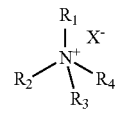

where $R_1$, $R_2$, $R_3$ is selected from the group consisting of: H; saturated or unsaturated alkyl groups containing $C_1$ to $C_{22}$ carbon atoms; aromatic groups; alkyl-aryl groups; heterocyclic groups; sugar groups; $R_4$ is an alkyl group containing $C_8$ to $C_{22}$ carbon atoms; X is selected from the group consisting of: anions, halogens, sulfate ions, nitrate ions, citrate ions, formate ions, phosphate ions, acetate ions, methylsulfonate ions, paratoluene sulfonates and chloride anions;
or a general formula:

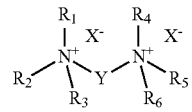

where $R_1$, $R_2$, $R_4$, $R_5$ is selected from the group consisting of: H; saturated or unsaturated alkyl groups containing $C_1$ to $C_{22}$ carbon atoms; aromatic groups; alkyl-aryl groups; heterocyclic groups; sugar groups; $R_3$, $R_6$ are selected from the group consisting of alkyl groups containing $C_8$ to $C_{22}$ carbon atoms; Y is hydrophobic, partially hydrophobic, aromatic, cyclic or acyclic and selected from the group consisting of: O; $O(CH_2)_n$ or $(CH_2)_n$, where n=1 to 18; ketonic groups, ester groups, amide groups; X is selected from the group consisting of: anions, halogens, sulfate ions, nitrate ions, citrate ions, formate ions, phosphate ions, acetate ions, methylsulfonate ions, paratoluene sulfonates and chloride anions; and argillaceous solids.

2. The drilling fluid of claim 1 wherein the fluid is substantially free of calcium chloride, potassium chloride, sodium chloride, magnesium sulfate, potassium acetate and formate.

3. The drilling fluid of claim 1 wherein the fluid is substantially free of organophilic clays and lignites.

4. The drilling fluid of claim 1 wherein the oleaginous continuous phase is selected from the group consisting of: paraffins; mineral oils; desulfurized hydrogenated kerosenes; and combinations thereof.

5. The drilling fluid of claim 1 wherein the alcohol is a selected from the group consisting of: lower polyhydric alcohols; glycerols; polyglycerols; and combinations thereof.

6. The drilling fluid of claim 1 wherein the quaternary ammonium emulsifier is selected from the group consisting of: Dodecyl Trimethyl Ammonium Chloride; Coconut Trimethyl Ammonium Chloride; Hexadecyl Trimethyl Ammonium Chloride; Octadecyl Trimethyl ammonium Chloride; Octadecyl/Behenyl Trimethyl Ammonium Chloride; Behenyl Trimethyl Ammonium Chloride; Cocoamidopropyl Trimethyl Ammonium Chloride; Coconut Bis(2-Hydroxyethy) Methyl Ammonium Chloride; Stearyl bis(2-Hydroxyethyl) Methyl Ammonium Chloride; Alkyl Dimethyl Benzyl Ammonium Chloride; Benzalkonium Chloride; Benzalkonium Chloride; Benzalkonium Chloride; Tetradecyl Dimethyl Benzyl Ammonium Chloride; Octadecyl Dimethyl Benzyl Ammonium Chloride; Dioctyl Dimethyl Ammonium Chloride; Di(Octyl-Decyl) Dimethyl Ammonium Chloride; Didecyl Dimethyl Ammonium Chloride; Didodecyl Dimethyl Ammonium Chloride; Dihexadecyl Dimethyl Ammonium Chloride; Distearyl Dimethyl Ammonium Chloride; Di(Hydrogenated Tallow)Dimethyl Ammonium Chloride; Di(Hydrogenated Tallow)Benzyl Methyl Ammonium Chloride; Trioctyl Methyl Ammonium Chloride; Tri (Octyl-Decyl) Methyl Ammonium Chloride; Tridodecyl Methyl Ammonium Chloride; Trihexadecyl Methyl Ammonium Chloride; Dodecyl Trimethyl Ammonium Bromide; Dodecyl Dimethyl Benzyl Ammonium Bromide; Di-(Octyl-Decyl) Dimethyl Ammonium Bromide; Didecyl Dimethyl Ammonium Bromide; Dilinoleyl Amidopropyl Trimonium Chloride; Bishydroxyethyl Dihydroxypropyl Stearammonium Chloride; Hydroxypropyl Bisstearyldimmonium Chloride, Isostearyl Ethylimidazolinium Ethosulfate; Linoleamidopropyl PG-Dimonium Chloride Phosphate; Propylene Glycol; Dihydroxypropyl PEG-5 Linoleammonium Chloride; and Dihydroxypropyl PEG-5 Linoleammonium Chloride.

7. The drilling fluid of claim 1 wherein the alcohol in the internal phase comprises at least about 40% by weight of the internal phase.

8. The drilling fluid of claim 1 wherein the internal phase further comprises water.

9. The drilling fluid of claim 1 wherein the quaternary ammonium emulsifier is selected from the group consisting of: quaternary alkyl-aryl ammonium compositions and quaternary ammonium compositions.

10. The drilling fluid of claim 1 wherein the quaternary ammonium emulsifier is methyl, benzyl dihydrogenated tallow quaternary amine chloride salt or dimethyl dihydrogenated tallow quaternary amine chloride salt.

11. A method for drilling in a subterranean formation having shales comprising:
providing or using an invert emulsion drilling fluid having:
a base oil;
an internal phase comprising an alcohol;
a quaternary ammonium emulsifier selected from the group consisting of quaternary ammonium compounds having a general formula:

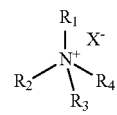

where $R_1$, $R_2$, $R_3$ are selected from the group consisting of: H; saturated or unsaturated alkyl groups containing $C_1$ to $C_{22}$ carbon atoms; aromatic groups; alkyl-aryl groups; heterocyclic groups; sugar groups; $R_4$ is an alkyl group containing $C_8$ to $C_{22}$ carbon atoms; X is selected from the groups consisting of: anions; halogens; sulfate ions; nitrate ions; citrate ions; formate ions; phosphate ion; acetate ion; methylsulfonate ion; paratoluene sulfonates; chloride anions,
or a general formula:

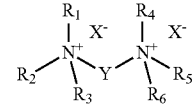

where $R_1$, $R_2$, $R_4$, $R_5$ are selected from the group consisting of: H; saturated or unsaturated alkyl groups containing $C_1$ to $C_{22}$ carbon atoms; aromatic groups; alkyl-aryl groups; heterocyclic groups; sugar groups; $R_3$, $R_6$ are selected from the group consisting of: alkyl groups containing $C_8$ to $C_{22}$ carbon atoms; Y is hydrophobic, partially hydrophobic, aromatic, cyclic or acyclic and is selected from the group consisting of: O; $O(CH_2)_n$; $(CH_2)_n$ where n=1 to 18; ketonic groups; ester groups; and amide groups; X is selected from the group consisting of anions; halogens; sulfate ions; nitrate ion; citrate ions; formate ions; phosphate ions; acetate ions; methylsulfonate ions; paratoluene sulfonates; and chloride anions; and
argillaceous solids; and
drilling through shales in the subterranean formation with the drilling fluid.

12. The method of claim 11 wherein the drilling fluid contains substantially no calcium chloride, potassium chloride, sodium chloride, magnesium sulfate, potassium acetate, formate, organophilic clays or lignites.

13. The method of claim 11 wherein the drilling is at temperatures up to about 325° F.

14. The method of claim 11 wherein the shales in the subterranean formation swell less than about 0.25% per hour during the drilling.

15. The method of claim 11 wherein the alcohol in the internal phase of the drilling fluid comprises at least about 40% by weight of the internal phase.

16. The method of claim 11 wherein the alcohol in the internal phase of the drilling fluid is selected from the group of alcohols consisting of glycerols, polyglycerols, and mixtures thereof.

17. The method of claim 11 wherein the base oil of the drilling fluid is selected from the group of oils consisting of paraffins, mineral oils, and kerosene.

18. The method of claim 11 wherein the quaternary ammonium emulsifier is methyl, benzyl dihydrogenated tallow quaternary amine chloride salt or dimethyl dihydrogenated tallow quaternary amine chloride salt or is selected from the group consisting of quaternary ammonium compositions and quaternary alkyl-aryl ammonium compositions.

19. The method of claim 11 wherein the drilling fluid further comprises a polyaminated fatty acid emulsifier.

20. An invert emulsion drilling fluid for drilling in a subterranean formation comprising:
- an oleaginous continuous phase;
- an internal phase comprising an alcohol;
- a quaternary ammonium emulsifier; and
- argillaceous solids.

\* \* \* \* \*